US012657260B2

(12) United States Patent
Guha et al.

(10) Patent No.: US 12,657,260 B2
(45) Date of Patent: Jun. 16, 2026

(54) SIMULATING TRAINING DATA TO MITIGATE BIASES IN MACHINE LEARNING MODELS

(71) Applicant: AT&T Intellectual Property I, L.P., Atlanta, GA (US)

(72) Inventors: Aritra Guha, Edison, NJ (US); Zhengyi Zhou, Chappaqua, NY (US); Balachander Krishnamurthy, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1041 days.

(21) Appl. No.: 17/661,026

(22) Filed: Apr. 27, 2022

(65) Prior Publication Data

US 2023/0350977 A1 Nov. 2, 2023

(51) Int. Cl.
*G06N 20/00* (2019.01)
*G06F 18/214* (2023.01)
*G06F 18/25* (2023.01)

(52) U.S. Cl.
CPC ........ *G06F 18/2148* (2023.01); *G06F 18/251* (2023.01); *G06N 20/00* (2019.01)

(58) Field of Classification Search
CPC .. G06F 18/2148; G06F 18/251; G06F 18/214; G06N 20/00
See application file for complete search history.

(56) References Cited

U.S. PATENT DOCUMENTS

| | | | |
|---|---|---|---|
| 2014/0115007 A1* | 4/2014 | Harvey | H04L 41/50 |
| | | | 707/796 |
| 2022/0101146 A1* | 3/2022 | el Kaliouby | G06N 3/08 |
| 2023/0154235 A1* | 5/2023 | Zhao | G06N 3/09 |
| | | | 382/118 |
| 2023/0169393 A1* | 6/2023 | Niu | G06N 5/01 |
| | | | 706/12 |
| 2023/0290132 A1* | 9/2023 | Mahendran | G06V 20/20 |

OTHER PUBLICATIONS

Nargesian, F., Asudeh, A., & Jagadish, H. V. (2021). "Tailoring Data Source Distributions for Fairness-aware Data Integration." Proceedings of the VLDB Endowment, 14(11), 2519-2532. (Year: 2021).*

(Continued)

*Primary Examiner* — Kc Chen

(57) ABSTRACT

A method performed by a processing system including at least one processor includes identifying an insufficiency in a representation of a subpopulation in training data for a machine learning model, generating simulated data to mitigate the insufficiency in the representation, and training the machine learning model using an enhanced training data set that includes the training data and the simulated data to produce a trained machine learning model. In some examples, the generating and the training may be repeated in response to determining that an output of the trained machine learning model still reflects the insufficiency in the representation of the subpopulation or reflects an insufficiency in a representation of another subpopulation. In other examples, the simulated data may be stored for future reuse.

19 Claims, 3 Drawing Sheets

200

(56) References Cited

OTHER PUBLICATIONS

Duan, L., Xu, D., & Tsang, I. (2012). "Learning with Augmented Features for Heterogeneous Domain Adaptation." Proceedings of the 29th International Conference on Machine Learning (ICML). (Year: 2012).*

Brooks et al., "Increasing Inclusivity in Machine Learning Outputs," U.S. Appl. No. 17/227,311, filed Apr. 10, 2021, 36 pages.

Sauer et al. "Counterfactual Generative Networks," in proc. International Conference on Learning Representations 2021, https://openreview.net/forum?id=BXewfAYMmJw.

* cited by examiner

200

300

SIMULATING TRAINING DATA TO MITIGATE BIASES IN MACHINE LEARNING MODELS

The present disclosure relates generally to machine learning, and relates more particularly to devices, non-transitory computer-readable media, and methods for targeted simulation of training data to mitigate biases in machine learning models.

BACKGROUND

Machine learning is a subset of artificial intelligence encompassing computer algorithms whose outputs improve with experience. A set of sample or "training" data may be provided to a machine learning algorithm, which may learn patterns in the training data that can be used to build a model that is capable of making predictions or decisions (outputs) based on a set of inputs (e.g., new data). Machine learning models may be used to automate the performance of repeated tasks, to filter emails, to provide navigation for unmanned vehicles, and to perform numerous other tasks or actions.

SUMMARY

The present disclosure broadly discloses methods, computer-readable media, and systems for targeted simulation of training data to mitigate biases in machine learning models. In one example, a method performed by a processing system including at least one processor includes identifying an insufficiency in a representation of a subpopulation in training data for a machine learning model, generating simulated data to mitigate the insufficiency in the representation and broaden a set of predictions generated by the machine learning model, and training the machine learning model using an enhanced training data set that includes the training data and the simulated data to produce a trained machine learning model. In some examples, the generating and the training may be repeated in response to determining that an output of the trained machine learning model still reflects the insufficiency in the representation of the subpopulation or reflects an insufficiency in a representation of another subpopulation. In other examples, the simulated data may be stored for future reuse.

In another example, a non-transitory computer-readable medium may store instructions which, when executed by a processing system including at least one processor, cause the processing system to perform operations. The operations may include identifying an insufficiency in a representation of a subpopulation in training data for a machine learning model, generating simulated data to mitigate the insufficiency in the representation, and training the machine learning model using an enhanced training data set that includes the training data and the simulated data to produce a trained machine learning model. In some examples, the generating and the training may be repeated in response to determining that an output of the trained machine learning model still reflects the insufficiency in the representation of the subpopulation or reflects an insufficiency in a representation of another subpopulation. In other examples, the simulated data may be stored for future reuse.

In another example, a device may include a processing system including at least one processor and a non-transitory computer-readable medium storing instructions which, when executed by the processing system, cause the processing system to perform operations. The operations may include identifying an insufficiency in a representation of a subpopulation in training data for a machine learning model, generating simulated data to mitigate the insufficiency in the representation, and training the machine learning model using an enhanced training data set that includes the training data and the simulated data to produce a trained machine learning model. In some examples, the generating and the training may be repeated in response to determining that an output of the trained machine learning model still reflects the insufficiency in the representation of the subpopulation or reflects an insufficiency in a representation of another subpopulation. In other examples, the simulated data may be stored for future reuse.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
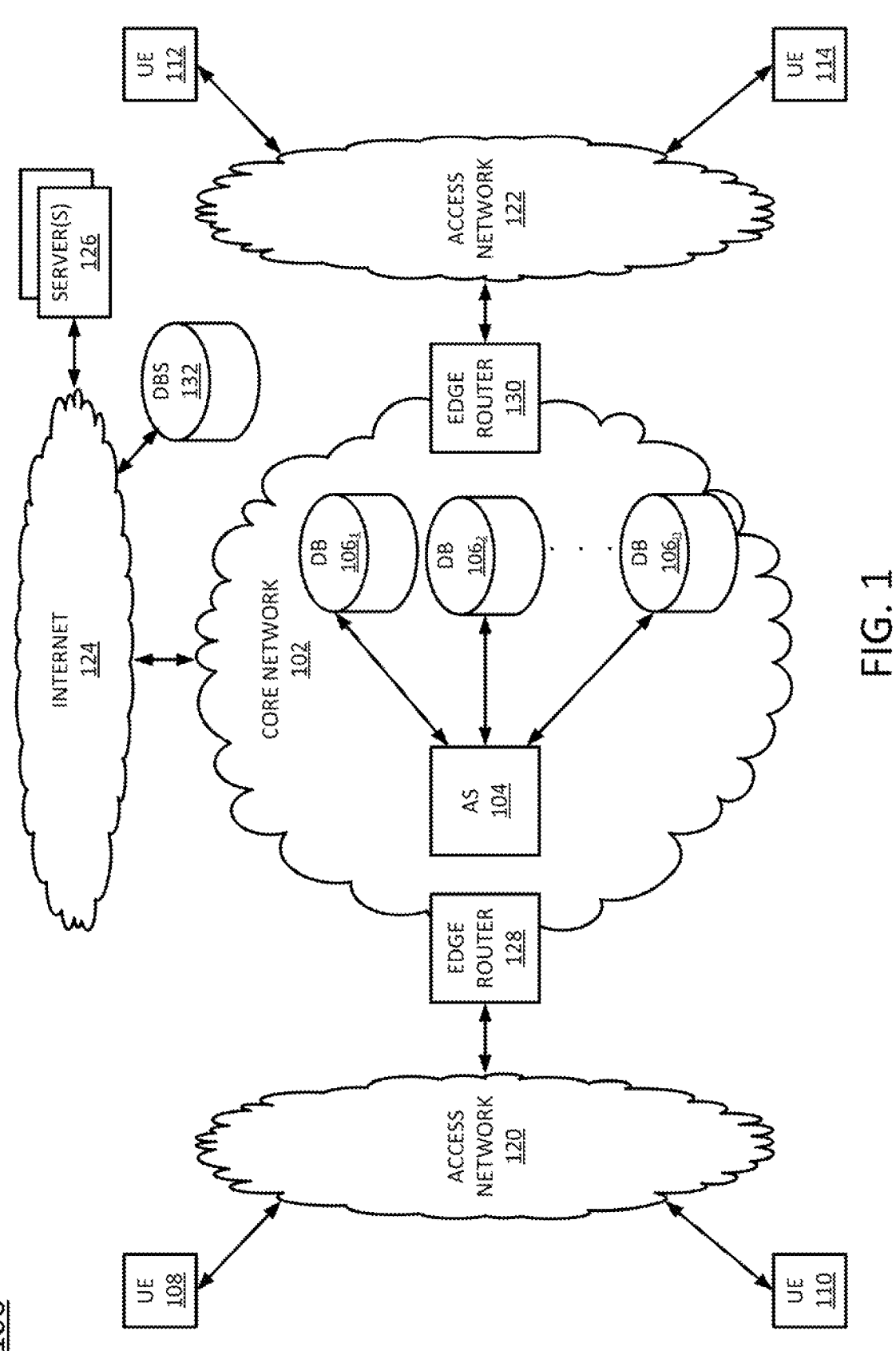
FIG. 1 illustrates an example system in which examples of the present disclosure for simulating data to mitigate biases in machine learning models may operate.

The present disclosure broadly discloses methods, computer-readable media, and systems for targeted simulation of training data to mitigate biases in machine learning models. As discussed above, machine learning algorithms are trained using a set of training data to make predictions or decisions (outputs) based on a set of inputs (e.g., new data). It has been observed that in some cases, the predictions generated by a machine learning model may be inadvertently and unfairly biased with respect to how the predictions represent one or more underrepresented subpopulations (e.g., groups of individuals sharing a common gender, race, ethnicity, religion, or the like). While these predictions may be partially rooted in algorithmic or human biases, biases in the training data (samples) used to train the machine learning data can also be perpetuated in the predictions. For instance, misrepresentation of aspects of a sample or group of samples (where the misrepresentation may be due to biases of the human who labeled the samples, biases in the process used to generate the samples, systemic reasons, missing samples, and/or other causes) may lead to machine learning outputs that can perpetuate and/or introduce biases.

As an example, it has been shown that highly unrepresentative images of particular segments of the population can be extracted from the Internet using machine learning algorithms. As an example, a particular computer vision model that was designed to generate full-body images of individuals based on input facial images was shown to treat male subjects differently from female subjects. More specifically, when presented with a female facial image as an input, more than fifty percent of the output images generated by the model depicted the subjects in a state of under-dress relative to the output images generated based on male facial images (which were more likely to depict the subjects wearing professional attire such as suits). Misrepresentation of images of minorities adds to the existing historical racial and gender biases and runs the risk of perpetuating these biases (e.g., due to the false trust which may be engendered in machine learning predictions).

Previous approaches to correcting for biases in training data included reweighting schemes. For instance, if a set of training data included too few samples for a given subpopulation, the training of the machine learning model might assign a higher weight to those samples relative to other samples which did not represent the given subpopulation, in an effort to balance the manner in which the samples were considered. However, the effectiveness of reweighting is limited by existing data distributions and sample spaces. For instance, if the set of training data included no samples for the given subpopulation, then reweighting might not be an effective way of balancing out representation of the given subpopulation. Other previous approaches include the use of auxiliary data sources that may be curated to provide information about specific subpopulations and/or features. However, auxiliary databases may not always be available or may contain limited information or insight into desired features.

Examples of the present disclosure proactively minimize biases in machine learning outputs by identifying insufficient representations (e.g., underrepresentation and/or misrepresentation) of subpopulations in the training data used to train a machine learning model. For instance, the training data may include too few samples that are representative of the subpopulation or may include samples that inaccurately or unfairly represent the subpopulation. To counter this insufficient representation, examples of the present disclosure generate simulated (e.g., synthetic) training data which is then inserted into the training data set used to train the machine learning model. Thus, the machine learning model is trained using a training data set that includes both the original training data (which insufficiently represented the subpopulation) and the simulated training data (which is targeted to balance out or correct for the insufficient representation of the subpopulation in the original training data).

Within the context of the present disclosure, "simulated" data is understood to refer to data that has not been observed or measured. In other words, simulated data may be created synthetically to resemble or mimic data that has been observed or measured (and potentially with reference to data that has been observed or measured). For instance, counterfactual generative networks or similar techniques may be used to generate the simulated data. These and other aspects of the present disclosure are discussed in greater detail below in connection with the examples of FIGS. 1-3.

To further aid in understanding the present disclosure, FIG. 1 illustrates an example system 100 in which examples of the present disclosure for simulating data to mitigate biases in machine learning models may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a plurality of databases (DBs) $106_1$-$106_n$ (hereinafter individually referred to as a "database 106" or collectively referred to as "databases 106"), and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable by a human user to provide guidance and feedback to the AS 104, which may be configured to train a machine learning model using simulated training data that is generated to mitigate potential biases that may exist in the existing training data and/or model output, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 and/or to AS 104 in the form of websites.

Figure 3:
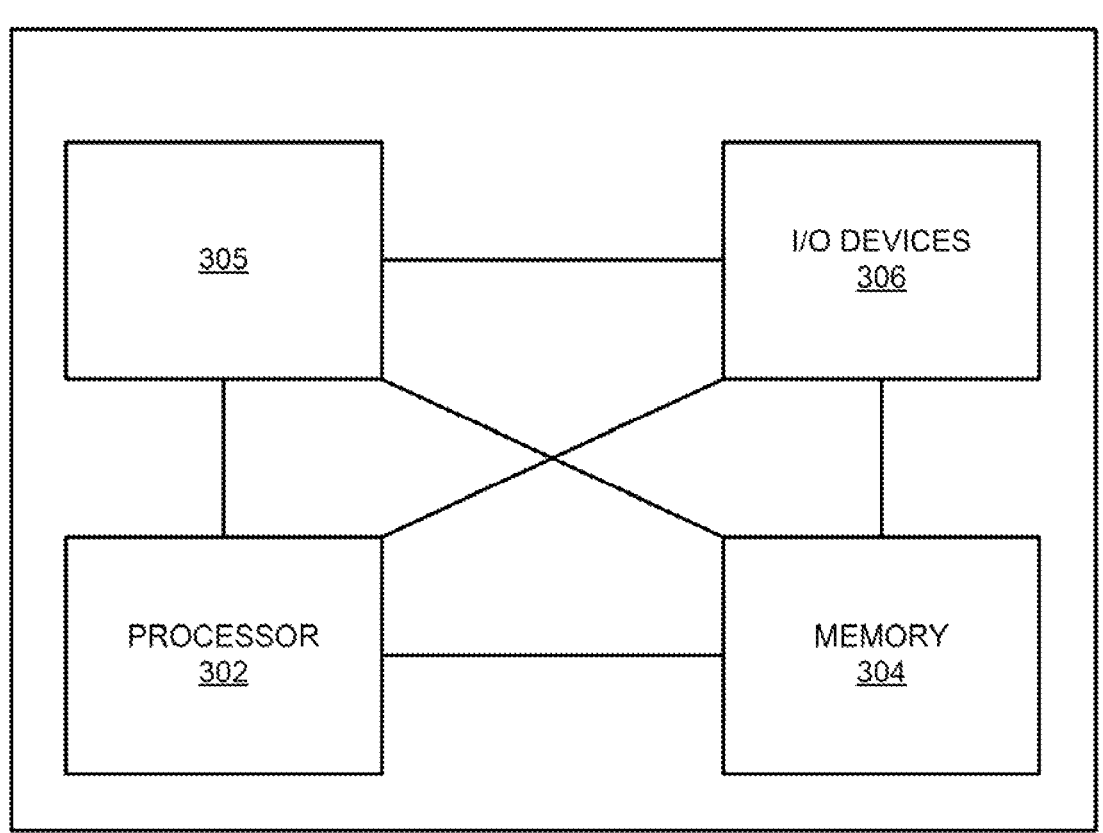
FIG. 3 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for simulating data to mitigate biases in machine learning models, as described herein. The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 104 may be configured to train a machine learning model using simulated training data that is generated to mitigate potential biases that may exist in the existing training data and/or model output. In particular, the AS 104 may be configured to identify potential insufficient representations of subpopulations in the training data for a machine learning model. The insufficient representation may comprise an underrepresentation (e.g., too few samples representing the subpopulation in the training data) or a misrepresentation (e.g., presence of samples in the training data that present the subpopulation in an inaccurate and/or biased manner). The subpopulation may comprise a demographic group that is historically and/or systematically underrepresented (e.g., a gender-based subpopulation, a racial subpopulation, an ethnic subpopulation, a religious subpopulation, etc.). In one example, the AS 104 may detect the insufficient representation of the subpopulation by examining the training data, the performance of the machine learning model (e.g., ability to meet a predefined performance metric), and/or the output of the machine learning model.

The AS 104 may also be configured to generate simulated (e.g., synthetic) training data to correct the insufficiency of the subpopulation's representation in the training data. For instance, the simulated training data may increase the number of entries in the training data that represent the subpopulation as well as improve the accuracy of the manner in which those entries represent the subpopulation. In this context, "entries" is understood to be a broad term that refers to data items contained in the training data, which may encompass both original/real data and simulated data. The term "samples" is understood to refer specifically to data items comprising original/real data rather than simulated data in this context. The AS 104 may generate the simulated training data by perturbing existing (e.g., not simulated) training data samples to generate new simulated samples and/or by generating new simulated samples from a given target distribution. The number of training data samples that are simulated may vary based on use case, target model performance, target training data distributions, and/or other factors.

The AS 104 may then train the machine learning model (or another device may train the machine learning model) using an enhanced training data set that includes both the original (insufficient, not simulated) training data and the newly generated simulated training data. The simulated training data may also be stored, with or without the original training data, e.g., in one of the DBs 106 and/or DB 132.

Furthermore, in one example, at least some of the DBs 106 may operate as auxiliary data sources that contain curated information that has been targeted to improve representation of historically and/or systematically underrepresented subpopulations as well as to other known vulnerabilities that may contribute to biased machine learning outputs. As an example, if the output of the machine learning model comprises retrieved public domain images of public figures, DB $106_1$ may store data about images depicting the public figures as they wish to be depicted. If the output of the machine learning model is a prediction as to whether certain speech on a social media website should be flagged as offensive, DB $106_2$ may store data about terminology that may be considered neutral or inoffensive in certain contexts (e.g., chess), but considered offensive in other contexts. New auxiliary data sources may be added at any time to the set of DBs 106 to address new and evolving vulnerabilities. Moreover, existing DBs may be updated at any time to include new data (e.g., data which has been discovered through search of new data sources or outputs of machine learning models).

In one example, the DBs 106 may comprise physical storage devices integrated with the AS 104 (e.g., a database server or a file server), or attached or coupled to the AS 104, in accordance with the present disclosure. In one example, the AS 104 may load instructions into a memory, or one or more distributed memory units, and execute the instructions for simulating data to mitigate biases in machine learning models, as described herein. One example method for simulating data to mitigate biases in machine learning models is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
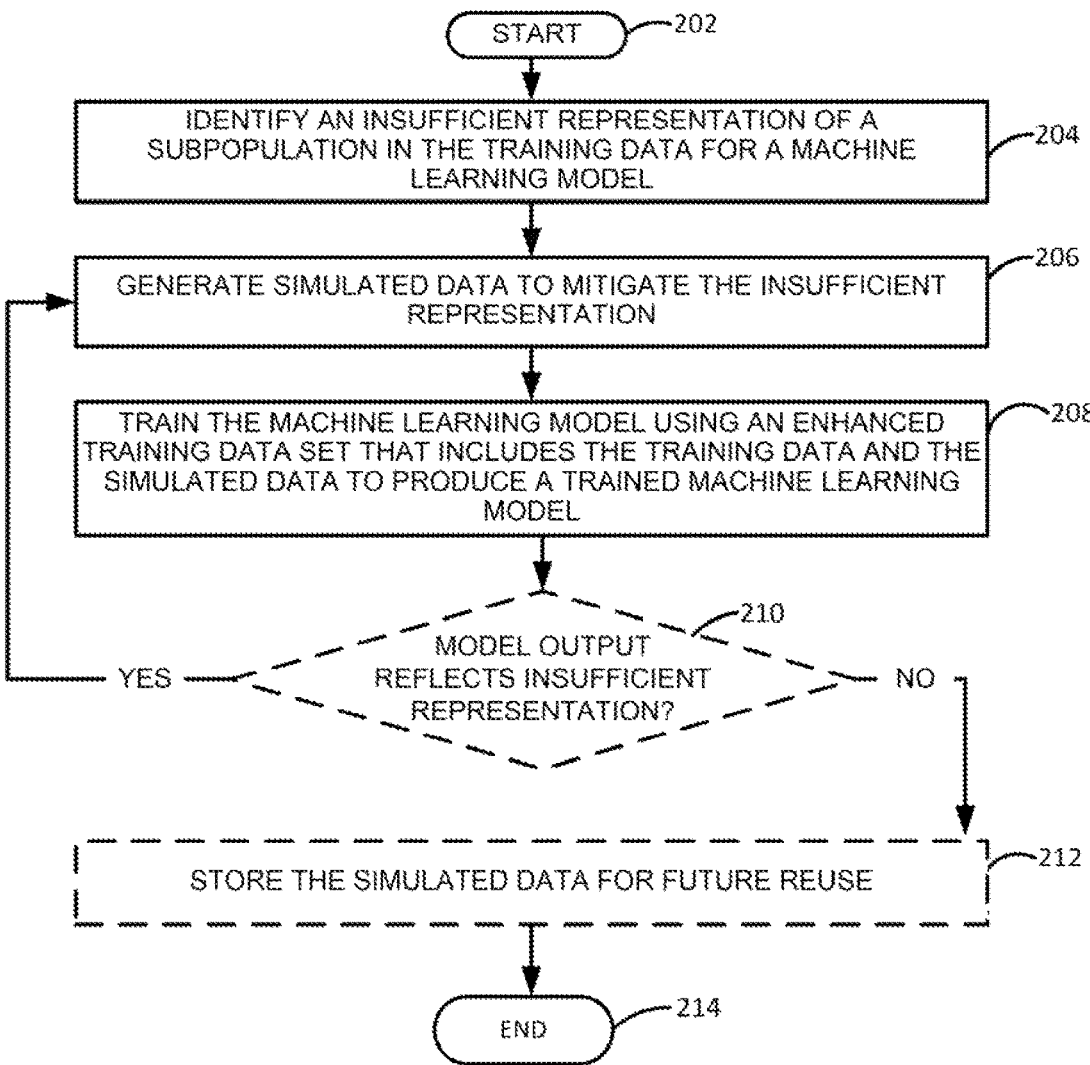
FIG. 2 illustrates a flowchart of an example method for simulating data to mitigate biases in machine learning models, in accordance with the present disclosure.

FIG. 2 illustrates a flowchart of an example method 200 for simulating data to mitigate biases in machine learning models, in accordance with the present disclosure. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 300, and/or a processing system 302 (e.g., having at least one processor) as described in connection with FIG. 3 below. For instance, the computing device 300 may represent at least a portion of the AS 104 in accordance with the present disclosure. For illustrative purposes, the method 200 is described in greater detail below in connection with an example performed by a processing system in an Internet service provider network, such as processing system 302.

The method 200 begins in step 202 and proceeds to step 204. In step 204, the processing system may identify an insufficiency in a representation of a subpopulation in the training data for a machine learning model.

In one example, the machine learning model may be trained to generate an output comprising one or more of: generated content (e.g., text, audio, video, or the like), a list of samples (e.g., data) prioritized by the machine learning algorithm (e.g., users, groups of user segments, enterprise or individual customers, or entities such as movies, television shows, advertisers, and the like), or a set of attributes and values considered important or of high value by a machine learning algorithm and/or domain knowledge. The training data may be used to train the machine learning model to generate this output based on a set of input features or attributes.

In one example, the subpopulation may represent a group of people who share a demographic attribute that is historically underrepresented and/or misrepresented. For instance, the subpopulation may represent an ethnic minority, a racial minority, a gender minority, or the like. An underrepresentation of the subpopulation in the training data may manifest itself in a lack of data points for accurate representation and/or comparison to the population at large. A misrepresentation of the subpopulation in the training data may manifest itself in an historical bias that is perpetuated by one or more data points.

In one example, an insufficiency in the representation of the subpopulation (e.g., an underrepresentation or a misrepresentation) may be identified automatically by conducting analytics on the training data. For instance, sample counts of the training data may indicate that a number of samples corresponding to the subpopulation fails to meet some threshold relative to the number of samples for other subpopulations and/or a total number of samples in the training data, where the threshold may be configured by the party for whom the machine learning model is being constructed. For instance, the party may request that the number of samples for the subpopulation constitute at least x percent of the total number of samples in the training data, or constitute no less than y percent of the number of samples for any other subpopulation in the training data.

In another example, an insufficiency in the representation of the subpopulation may be identified automatically by analysis of the machine learning output (i.e., the output of the machine learning model), if the machine learning model has been constructed. For instance, machine learning model outcome or performance metrics may be measured across one or more subpopulations in the machine learning output. These performance metrics may be configured by the party for whom the machine learning model is being constructed. For instance, the party may request that the model accuracy metric for the subpopulation be at least x, or the disparate impact score for the subpopulation be at least y. In one example, an insufficiency in the representation of the subpopulation may be revealed as a result of a test scenario that is input, along with the training data, into the machine learning model.

In another example, an insufficiency in the representation of the subpopulation may be identified automatically through comparison to other existing sets of training data. The other existing sets of training data may comprise sets of training data comprising samples that are similar to the samples in the training data and/or sets of training data used to train machine learning models for use cases that are similar to a user case for the machine learning model. For instance, if the machine learning model is to be trained to generate a set of candidates for a data scientist job, then the training data may be compared to other existing sets of training data that were used by other machine learning models to generate sets of job candidates, or sets of job candidates for data science jobs specifically. In one example, the other existing sets of training data may contain known misrepresentations or under-representations of one or more subpopulations, and if the representation of those subpopulations in the training data is similar (e.g., within a threshold of similarity), then the representation of those subpopulations in the training data may be identified as insufficient. Conversely, the other existing sets of training data may be known to represent one or more subpopulations sufficiently (e.g., to satisfy a given threshold or metric), and if the representation of those subpopulations in the training data is similar (e.g., within a threshold of similarity), then the representation of those subpopulations in the training data may be identified as sufficient.

In another example, an insufficiency in the representation of the subpopulation may be identified manually through analysis by a domain expert. For instance, a human expert in the domain to which the machine learning model is targeted, or a human expert in the representation of insufficiently represented subpopulations, may be brought in to review the training data and to identify any potential under-representations or misrepresentations of subpopulations in the training data. The domain expert may look for specific known instances of under-representations or misrepresentations in the training data. For instance, the domain expert may be aware that in the field of data scientists, women data scientists tend to be underrepresented, or that in training data comprising photographs, lighting effects tend to misrepresent subpopulations having darker skin tones. In one example, an insufficiency in the representation of the subpopulation may initially be identified automatically, and a human domain expert may subsequently be brought in to review and/or verify the automatic results. For instance, the human domain expert may rank order, modify, or augment any insufficiencies that were automatically identified.

In step 206, the processing system may generate simulated data to mitigate the insufficient representation. For instance, if the training data comprises samples of observed or measured (i.e., real) data, such as features extracted from real resumes of job candidates, real images of individuals captured by camera, or the like, then the simulated data may comprise data that is not observed or measured (i.e., not real but synthetically generated).

For instance, in one example, the simulated data may be generated by using generative modeling to perturb one or more data points in the training data. As an example, if the training data comprises samples that each include a first set of features extracted from real resumes of data scientists, and the real resumes include one hundred resumes of male candidates but only ten resumes of female candidates, then a simulated training data sample may be generated that contains a second set of features which are the same as the first set of features and potentially include the same values for those features, but in which the value for the feature pertaining to the insufficiently represented subpopulation (e.g., gender) has been modified to balance the representation. In other words, the simulated data may mimic the feature values of the data points in the training data (e.g., may utilize similar values for features such as degree level, years of experience, and the like) but for the feature of gender may indicate the value of "female." As another example, the simulated data may perturb the feature pertaining to the insufficiently represented subpopulation (e.g., gender) together with a few other correlated features (e.g., whether the candidate has attended a women's college).

In one example, perturbation of data points may be guided by knowledge of features that have been learned to be salient or significant in influencing the output of machine learning models for use cases similar to the use case of the machine learning model. For instance, this knowledge may indicate which values of the input features should be perturbed and why (e.g., historic underrepresentation of women in the data science field). The amount of simulated data that is generated may be determined based on the ability of the simulated data to produce an accurate machine learning output when used to train the machine learning model or on a comparison to an amount of the training data for the population at large (e.g., so that the subpopulation is not routinely overlooked).

In one example, the generation of the simulated data may be performed with an eye to achieve a target distribution in either the training data or the machine learning output. For instance, the party for whom the machine learning model is being constructed may define or configure a desired distribution for representation of specific subpopulations. The distributions may be guided by legal thresholds, ethical concerns, or other factors which may define what an output distribution for a specific subpopulation should look like, and the simulated data may be generated to achieve that output distribution.

In one example, the target distribution may comprise a distribution of the subpopulation for whom the representation is insufficient in the training data, and the simulated data may be generated to provide more data points for the subpopulation that are similar to existing data points in the training data. In another example, the target distribution may comprise a distribution of the population at large in the machine learning output, and the simulated data may be generated to provide new data points for the subpopulation that will produce a distribution for the subpopulation in the machine learning output that is similar to the distribution of the population at large in the machine learning output. Where the simulated data is generated to produce a target distribution in the machine learning output, this may help to reduce instances of unfair representation, especially in cases where the shared attribute of the subpopulation (e.g., gender, race, ethnicity, religion, etc.) should not affect the output.

In some examples, generation of simulated data may include the simulation of values for input features that may only be present for one source of data. For instance, in some cases, the training data from a first source may be augmented with auxiliary data from an auxiliary data source that is specifically curated to minimize biases toward particular subpopulations. The auxiliary data may contain features that are not present in the training data from the first source. In this case, the simulated training data may include values for features that are present in the training data from the first source, but not in the auxiliary data and/or values for features that are present in the auxiliary data, but not in the training data from the first source. In some examples, generation of simulated data may comprise combining features from a plurality of different auxiliary data sources.

In step 208, the processing system may train the machine learning model using an enhanced training data set that includes the training data and the simulated data to produce a trained machine learning model. In other words, the enhanced training data set includes both: (1) the original training data in which the insufficient representation for the subpopulation was identified in step 204; and (b) the simulated data that was generated to possibly mitigate the insufficient representation in step 206. In one example, the enhanced training data set may further include auxiliary data which was obtained from an auxiliary data source that is specifically curated to minimize biases toward the subpopulation. In a further example, the original training data, the simulated data, and the auxiliary data (if present) may be weighted to balance either the volume of training data across the subpopulation or the machine learning output across the subpopulation.

In optional step 210 (illustrated in phantom), the processing system may determine whether an output of the trained machine learning model reflects an insufficient representation of any subpopulation. For instance, the processing system may deploy the trained machine learning model into use or may test the trained machine learning model on a plurality of different scenarios. The output that results from the deployment and/or testing may be compared to a predefined performance metric or performance target in order to determine whether the output satisfied the predefined performance metric or performance target. For instance, as discussed above, in one example, the performance target may be a target distribution of the subpopulation in the output.

The determination in step 210 may involve drawing a conclusion as to whether the output of the trained machine learning model reflects the previously identified insufficient representation of the subpopulation for whom the simulated data was generated (e.g., a conclusion as to whether the simulated data achieved the desired mitigation) or drawing a conclusion as to whether the output of the trained machine learning model reflects a newly identified insufficient representation of another subpopulation for whom no simulated data has yet been generated (e.g., a conclusion that there is another insufficient representation to be mitigated).

If the processing system concludes in step 210 that the output of the trained machine learning model reflects an insufficient representation of any subpopulation, then the method 200 may return to step 206, and the processing system may proceed as described above to generate simulated data to mitigate the insufficient representation. If, however, the processing system concludes in step 210 that the output of the trained machine learning model does not reflect an insufficient representation of any subpopulation, then the method 200 may proceed to optional step 212.

In optional step 212 (illustrated in phantom), the processing system may store the simulated data for future reuse. In one example, the simulated data may be stored with the training data (e.g., the entire enhanced training data set may be stored). In another example, the simulated data may be stored on its own (e.g., without the original training data in which the insufficient representation was detected). In one example, the data is aligned with context when stored for reuse, in order to prevent misuse.

Storage of the simulated data allows the simulated data to be reused to train future versions of and/or updates to the trained machine learning model. Storage of the simulated data also allows the simulated data to be reused to train other future machine learning models for similar and/or different use cases. Storage of the simulated data also allows the simulated data to be reused in combination with other training data, other simulated data, and/or auxiliary data used to train other future machine learning models for similar and/or different use cases.

The method may end in step 214.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Thus, examples of the present disclosure generate simulated training data with which to correct underrepresentation and/or misrepresentation of a subpopulation in the training data for a machine learning model. The machine learning model may then be trained with an enhanced training data set that includes both the original trainings data (which included the underrepresentation and/or misrepresentation) and the simulated data, and may optionally include auxiliary data as well. The disclosed approach, which relies on the generated of simulated training data, provides improved correction of biases relative to existing techniques such as re-weighting of training data samples, which are limited by existing data distributions and sample spaces. Moreover, the disclosed approach allows for training using samples that represent subpopulations for which existing trainings samples may be difficult to find (e.g., due to paucity of data sources, high cost, lack of appropriate documentation, and/or other factors). Examples of the present disclosure therefore provide improved representation of and reduce bias against subpopulations that may be systematically underrepresented and/or misrepresented.

Furthermore, the output of a machine learning model that is trained using the simulated training data may be used to determine salient features of the training data which may be helpful in resolving biases propagated through seemingly harmless and/or non-sensitive features of the training data.

Moreover, the simulated training data is relatively easy and inexpensive to generate, making the proposed approach cost effective. Further cost efficiency can be realized by reusing the simulated training data for other training data sets and use cases.

It is worth noting that in some cases, it may not be possible to detect auxiliary sources for all use cases and/or underrepresented subpopulations. In such a scenario, the disclosed approach may be used to resample data from a machine learning model's original training data set with generative sampling of demographic and/or other sensitive information to account for misrepresentations of the subpopulation.

Examples of the present disclosure may be implemented to reduce bias in a variety of machine learning use cases. For instance, as one example, the autocorrect feature that is common in many electronic messaging applications (e.g., email, text messaging, etc.) and Internet search engines may inadvertently introduce bias when trying to correct a user's typed entry. Auto-correction typically uses frequency of counts occurring in historical data (e.g., similar search terms and/or misspellings most frequently entered by other users in the past) when correcting a new entry. Thus, auto-correction may assume, when a user enters a search string that is slightly different from a known search string (e.g., with a low Hamming/Levenshtein distance), that this slightly different search string is misspelled and that the user intended to enter the known search string. This assumption is often, but not always, correct. Based on this assumption, auto-correction may replace the presumably misspelled search string with a similar known search string having the highest frequency of occurrence.

For instance, a user may type the search term "WNBA"™ (i.e., the acronym for the Women's National Basketball Association) into the search bar of a search engine website, and the search engine may automatically correct the search term to "NBA"™ (i.e., the acronym for the National Basketball Association), which may lead to a search that is gender biased.

In one example, the present disclosure may be implemented to mitigate this biased assumption. For instance, in one example, whenever a user types a term that triggers the autocorrect function, the system may search for any recent additions to a pool of known terms that have a connotation related to an underrepresented subpopulation (e.g., a gender-, ethnic-, racial-, and/or religious-based subpopulation) and that are within a threshold Hamming/Levenshtein distance from the user-provided term. Any terms that are detected by the search may subsequently be inserted into a set of training data for the autocorrect function and assigned a frequency that is comparable to the frequency of the term to which the autocorrect function initially wanted to change the user-provided term. In one example, the set of training data may be augmented with multiple instances of hitherto omitted terms relating to underrepresented subpopulations in order to increase the weight of these terms in training of the autocorrect function.

Thus, the training data set for the autocorrect function may be augmented with better contextual information and in a manner that deliberately inflates the importance of the contextual information to reduce the risk of the contextual information being overlooked. In a further example, a test data set for the autocorrect function may also be augmented with the recent additions to the pool of known terms.

As another example, digital photography collections may be skewed toward lighter skin tones (e.g., due to lighting conditions that favor lighter skin tones being used to photograph all skin tones). Thus, machine learning models that are trained on these photography collections (e.g., for facial recognition, person tracking, and/or other use cases) may be able to make much more accurate predictions for individuals having lighter skin tones, while making less accurate or potentially offensive predictions for individuals having darker skin tones.

In one example, the present disclosure may be implemented to mitigate this biased outcome. For instance, in one example, a number of real and/or synthetic photographs of individuals with varying skin tones may be added into the training data set. In one example, the real and/or synthetic photographs may be crowdsourced from auxiliary data sources and optionally adjusted. In one example, the number of added real and/or synthetic photographs that is added to the training data set may be chosen so that the training data set contains a roughly equal (e.g., equal within some permissible margin of error) number of photographs of lighter skin tones and darker skin tones. In one example, synthetic photographs may be generated for inclusion on the training data set using counterfactual generative networks. In this case, generating counterfactual image data ensures less reliance on image backgrounds and/or textures in the training of the machine learning model.

As another example, there have been observed instances of autonomous vehicles striking, and in some cases seriously hurting or even killing, pedestrians. For instance, in one particular example in 2018, a pedestrian in Tempe, Arizona was pushing a bicycle across the street when she was struck and killed by an autonomous vehicle. In this case, the classifier of the autonomous vehicle failed to correctly classify the composite object of "pedestrian pushing a bicycle." Instead, according to the National Transportation and Safety Board report on the accident, the classifier "changed the pedestrian's classification several times, alternating between vehicle, bicycle, and other. Furthermore, with each change in object classification, the [classifier] perceived the pedestrian as a new object without considering its location history" (NTSB, "Collision Between Vehicle Controlled by Developmental Automated Driving System and Pedestrian, Tempe, Arizona, Mar. 18, 2018," page 51). In other words, each time the classifier re-classified the pedestrian, any prior trajectory prediction was erased, and a new trajectory was computed. Ultimately, the autonomous vehicle never slowed down, even though the pedestrian was identified as a potential obstacle over five seconds prior to the collision.

In one example, the present disclosure may be implemented to mitigate this dangerous outcome. For instance, in one example, a number of synthetic photographs may be generated to depict various road conditions (including accidents) that may occur and that may not be represented in the training data used to train the machine learning models that operate an autonomous vehicle. Various combinations or possibilities of transitive and/or stationary entities on roadways may be depicted in the synthetic photographs. As an example, the various road conditions may include pedestrians crossing outside of crosswalks. The synthetic photographs may then be used to test the existing machine learning models in order to discover further situations in which the machine learning models may generate undesirable outputs (e.g., failing to identify an entity outside of a crosswalk as a pedestrian). This, in turn, may inform the collection of additional synthetic photographs for those further situations. All synthetic photographs that are generated may be used to train, retrain, update, and/or test existing and future machine learning models for operating autonomous vehicles.

FIG. 3 depicts a high-level block diagram of a computing device or processing system specifically programmed to perform the functions described herein. As depicted in FIG. 3, the processing system 300 comprises one or more hardware processor elements 302 (e.g., at least one central processing unit (CPU), a microprocessor, or a multi-core processor), a memory 304 (e.g., random access memory (RAM) and/or read only memory (ROM)), a module 305 for simulating data to mitigate biases in machine learning models, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for simulating data to mitigate biases in machine learning models s (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for simulating data to mitigate biases in machine learning models (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
identifying, by a processing system including at least one processor, an insufficiency in a representation of a subpopulation in training data for a machine learning model, wherein the identifying comprises detecting that a number of samples corresponding to the subpopulation in the training data fails to meet a threshold relative to at least one of: a number of samples for other subpopulations in the training data or a total number of samples in the training data;
generating, by the processing system, simulated data to mitigate the insufficiency in the representation, wherein the generating is performed by combining features from a plurality of different auxiliary data sources, wherein at least one of the features comprises a new feature that was not present in the training data, and wherein the generating is performed until a quantity of the simulated data combined with the number of samples corresponding to the subpopulation in the training data to at least meet the threshold relative to the at least one of: the number of samples for other subpopulations in the training data or the total number of samples in the training data;
training, by the processing system, the machine learning model using an enhanced training data set that includes the training data and the simulated data to produce a trained machine learning model, so that a bias against the subpopulation is minimized in an output generated by the trained machine learning model; and repeating, by the processing system, the generating and the training until the output of the trained machine learning model no longer reflects the insufficiency in the representation of the subpopulation.

2. The method of claim 1, wherein the insufficiency comprises an underrepresentation of the subpopulation in the training data.

3. The method of claim 1, wherein the insufficiency comprises a misrepresentation of the subpopulation in the training data.

4. The method of claim 1, wherein the subpopulation represents a group of people who share a demographic attribute that is historically underrepresented or historically misrepresented.

5. The method of claim 1, wherein the identifying further comprises detecting that a performance metric measured across the subpopulation in an output of the machine learning model fails to meet a predefined threshold.

6. The method of claim 1, wherein the identifying further comprises comparing the training data to another existing set of training data for another machine learning model, and wherein the another existing set of training data contains a known misrepresentation or under-representation of the subpopulation.

7. The method of claim 1, wherein the identifying further comprises comparing the training data to another existing set of training data for another machine learning model, and wherein the another existing set of training data is known to sufficiently represent the subpopulation.

8. The method of claim 1, wherein the identifying is based on a result of a manual analysis by a domain expert.

9. The method of claim 1, wherein the generating comprises perturbing a sample in the training data to generate a new sample.

10. The method of claim 9, wherein the sample comprises a first plurality of features, the new sample comprises a second plurality of features matching the first plurality of features, wherein a first subset of the second plurality of features includes values that mimic values of corresponding features of the first plurality of features, and wherein a second subset of the second plurality of features includes a value that has been modified relative to a value of a corresponding feature in the first plurality of features to represent the subpopulation.

11. The method of claim 1, wherein the generating is performed to achieve at least one of: a target distribution for the subpopulation in the training data or a target distribution for the subpopulation in an output of the machine learning model.

12. The method of claim 1, wherein the new feature was not present in the training data for the machine learning model.

13. The method of claim 12, wherein the new feature is extracted from an auxiliary data source of the plurality of different auxiliary data sources that is curated to minimize the bias toward the subpopulation.

14. The method of claim 1, further comprising:
storing, by the processing system, the simulated data for future reuse.

15. The method of claim 1, further comprising:
storing, by the processing system, the simulated data for future reuse;
determining, by the processing system, that an output of the trained machine learning model reflects an insufficient representation, wherein the insufficient representation comprises at least one of: the insufficiency in the representation of the subpopulation or an insufficiency in a representation of another subpopulation; and repeating, by the processing system in response to the determining, the generating and the training.

16. The method of claim 1, wherein the machine learning model is trained to perform an autocorrection function in a text-based electronic messaging application, and a minimization of the bias results in a reduced occurrence of the autocorrection function correcting known terms that have a connotation related to the subpopulation.

17. The method of claim 1, wherein the machine learning model is trained to classify objects detected in the trajectory of an autonomous vehicle, and a minimization of the bias results in a reduced occurrence of misclassification of the objects.

18. A non-transitory computer-readable medium storing instructions which, when executed by a processing system including at least one processor, cause the processing system to perform operations, the operations comprising:

identifying an insufficiency in a representation of a subpopulation in training data for a machine learning model, wherein the identifying comprises detecting that a number of samples corresponding to the subpopulation in the training data fails to meet a threshold relative to at least one of: a number of samples for other subpopulations in the training data or a total number of samples in the training data;

generating simulated data to mitigate the insufficiency in the representation, wherein the generating is performed by combining features from a plurality of different auxiliary data sources, wherein at least one of the features comprises a new feature that was not present in the training data, and wherein the generating is performed until a quantity of the simulated data combined with the number of samples corresponding to the subpopulation in the training data to at least meet the threshold relative to the at least one of: the number of samples for other subpopulations in the training data or the total number of samples in the training data;

training the machine learning model using an enhanced training data set that includes the training data and the simulated data to produce a trained machine learning model, so that a bias against the subpopulation is minimized in an output generated by the trained machine learning model; and repeating, by the processing system, the generating and the training until the output of the trained machine learning model no longer reflects the insufficiency in the representation of the subpopulation.

19. A device comprising: a processing system including at least one processor; and a non-transitory computer-readable medium storing instructions which, when executed by the processing system, cause the processing system to perform operations, the operations comprising:

identifying an insufficiency in a representation of a subpopulation in training data for a machine learning model, wherein the identifying comprises detecting that a number of samples corresponding to the subpopulation in the training data fails to meet a threshold relative to at least one of: a number of samples for other subpopulations in the training data or a total number of samples in the training data;

generating simulated data to mitigate the insufficiency in the representation, wherein the generating is performed by combining features from a plurality of different auxiliary data sources, wherein at least one of the features comprises a new feature that was not present in the training data, and wherein the generating is performed until a quantity of the simulated data combined with the number of samples corresponding to the subpopulation in the training data to at least meet the threshold relative to the at least one of: the number of samples for other subpopulations in the training data or the total number of samples in the training data; training the machine learning model using an enhanced training data set that includes the training data and the simulated data to produce a trained machine learning model, so that a bias against the subpopulation is minimized in an output generated by the trained machine learning model; and repeating, by the processing system, the generating and the training until the output of the trained machine learning model no longer reflects the insufficiency in the representation of the subpopulation.

* * * * *